(12) United States Patent
Smith et al.

(10) Patent No.: US 9,174,590 B2
(45) Date of Patent: Nov. 3, 2015

(54) FASCIA BRACKET MOUNTING SYSTEM—CAPTIVE FLOATING NUT SYSTEM TO WELD STUD

(75) Inventors: Bradley D. Smith, Caledonia, MI (US); Jason A. Meyers, Shelby Township, MI (US); Mark H. Delcourt, Richmond, MI (US); Sean Tomaselli, Ontario (CA)

(73) Assignee: NEWFREY LLC, Newark, DE (US)

( * ) Notice: Subject to any disclaimer, the term of this patent is extended or adjusted under 35 U.S.C. 154(b) by 630 days.

(21) Appl. No.: 13/448,518

(22) Filed: Apr. 17, 2012

(65) Prior Publication Data

US 2013/0272778 A1   Oct. 17, 2013

(51) Int. Cl.
*B60R 13/04* (2006.01)
*B60R 13/02* (2006.01)
*F16B 41/00* (2006.01)

(52) U.S. Cl.
CPC .............. *B60R 13/04* (2013.01); *B60R 13/0206* (2013.01); *F16B 41/002* (2013.01); *Y10T 403/471* (2015.01)

(58) Field of Classification Search
USPC .............. 411/187, 188; 24/297; 403/348, 349
See application file for complete search history.

(56) References Cited

U.S. PATENT DOCUMENTS

| | | | |
|---|---|---|---|
| 1,402,399 A | 1/1922 | Crabill et al. | |
| 2,037,586 A | 6/1934 | Olson | |
| 4,828,444 A * | 5/1989 | Oshida | 411/437 |
| 5,092,643 A | 3/1992 | Okamoto et al. | |
| 5,291,639 A * | 3/1994 | Baum et al. | 24/297 |
| 5,332,347 A * | 7/1994 | Kimisawa | 411/182 |
| 7,179,038 B2 | 2/2007 | Reindl | |
| 7,226,259 B2 | 6/2007 | Harris | |
| 7,871,102 B2 * | 1/2011 | Slobodecki et al. | 280/728.2 |
| 8,011,866 B2 * | 9/2011 | Harris | 411/150 |
| 2003/0214153 A1 * | 11/2003 | Kanie | 296/193.07 |
| 2004/0009051 A1 | 1/2004 | Roberts et al. | |
| 2005/0052056 A1 * | 3/2005 | Kanie | 296/204 |
| 2006/0093456 A1 * | 5/2006 | Delcourt | 411/171 |
| 2009/0133228 A1 | 5/2009 | Werner et al. | |
| 2010/0187841 A1 | 7/2010 | Sano | |

* cited by examiner

*Primary Examiner* — Victor MacArthur
(74) *Attorney, Agent, or Firm* — Harness, Dickey & Pierce, P.L.C.

(57) ABSTRACT

A system for coupling a trim component to a body component having a bearing surface. The system has a threaded weld fastener coupled to the body. The trim piece has an exterior bearing surface and an interior bearing surface. Defined within the trim piece is an aperture having a lead-in portion. A rotatable fastener having a nut body with a cylindrical body portion is floatably positioned within the aperture. The body defines a fastener holding aperture and defines a side slot.

20 Claims, 3 Drawing Sheets

FASCIA BRACKET MOUNTING SYSTEM—CAPTIVE FLOATING NUT SYSTEM TO WELD STUD

FIELD

The present disclosure relates to a floating coupling mechanism for a fascia component, and more particularly to a floating nut component.

BACKGROUND AND SUMMARY

This section provides background information related to the present disclosure which is not necessarily prior art.

Vehicle bodies are complex assemblies that typically include inner and outer panels coupled to a sheet metal body. Polymer panels, therefore, must be structurally able to securely attach to the sheet metal interior and exterior structures while presenting to the customer an aesthetically pleasing surface. Traditionally, an even gap between components is aesthetically desirable.

SUMMARY

This section provides a general summary of the disclosure, and is not a comprehensive disclosure of its full scope or all of its features.

A system for coupling a trim piece to a sheet metal component is provided. The system includes a fastener welded to the sheet metal component. The trim component has a bearing surface configured to bear against a sheet metal bearing surface. A press on and rotatably removable fastener having a generally cylindrical body is provided which defines a cylindrical fastener capturing aperture therein. The cylindrical body defines a side slot configured to accept a locking finger on a movable flange on the trim component. The cylindrical interior cavity has a first portion having a first diameter, and a second portion having a second diameter larger than a diameter of the weld fastener. The rotatable fastener is rotatable from a first position to a second position to release the fastener.

According to other teachings, a system for coupling a trim component to a body component having a threaded weld fastener coupled to the body component. The trim piece has an exterior bearing surface and an interior bearing surface. Defined within the trim piece is an aperture having a lead-in portion. A rotatable fastener having a nut body with a cylindrical body portion is floatably positioned within the aperture. The body defines a fastener holding aperture and defines a side slot. Additionally, the aperture has an exterior carrying flange configured to bear against the exterior slot bearing surface upon rotation of the nut.

According to another embodiment, a system for coupling a trim component to a sheet metal component is disclosed. The system includes a weld stud coupled to the sheet metal. The trim piece has a first sheet metal bearing surface, and an interior surface opposite the first surface, the trim piece defines aperture having a circular bearing section. A nut is disposed within the aperture. The aperture has first and second flanges disposed on either sides of the aperture. The first and second flanges define a protruded surface configured to apply forces onto the nut when the nut is floating within the aperture.

Further areas of applicability will become apparent from the description provided herein. The description and specific examples in this summary are intended for purposes of illustration only and are not intended to limit the scope of the present disclosure.

This section provides a general summary of the disclosure, and is not a comprehensive disclosure of its full scope or all of its features.

BRIEF DESCRIPTION OF THE DRAWINGS

The invention is described in detail below using exemplary embodiments represented in the drawings. Shown are.

Corresponding reference numerals indicate corresponding parts throughout the several views of the drawings.

DETAILED DESCRIPTION

Example embodiments will now be described more fully with reference to the accompanying drawings.

Figure 1:
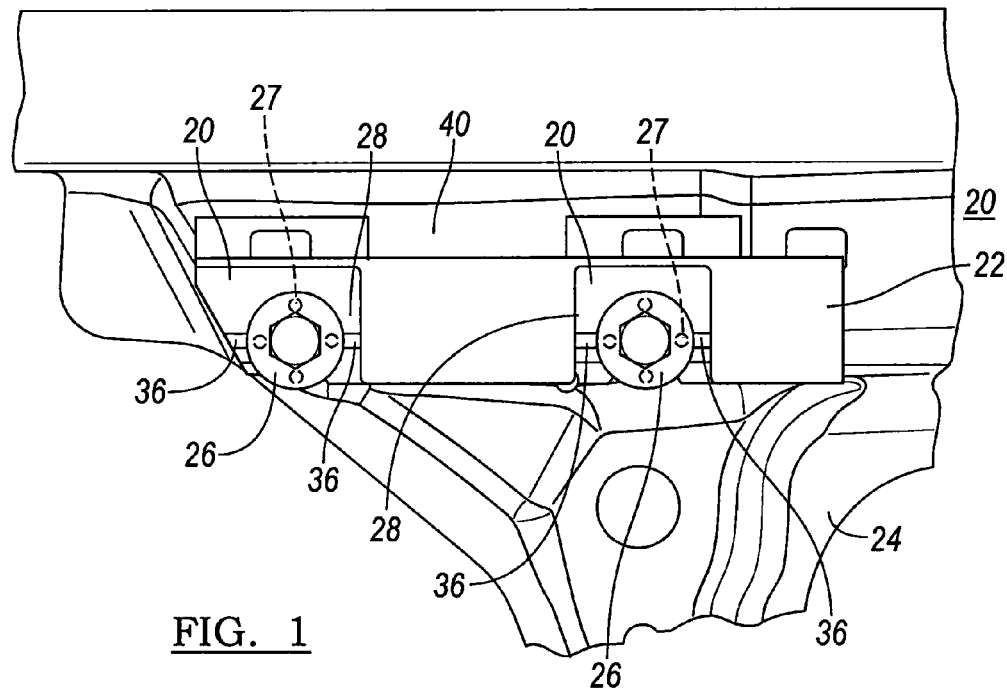
FIG. 1 is a view of a first face of an exemplary embodiment of a fastener system according to the present teachings.

FIG. 1 represents a front view of the coupling mechanism 20 for coupling a trim component 22 to a sheet metal structure 24 in its engaged position. It is envisioned the trim component 22 would have an aesthetically pleasing exterior surface (not shown) which is being coupled to the sheet metal structure. The coupling mechanism 20 has a rotatable fastener 26 disposed within an aperture 28 defined within a trim component coupling area 30. The trim coupling area 30 has a first bearing member 32 configured to bear against a first bearing surface 34 on the sheet metal structure 24. The rotatable fastener 26 can have a plurality of locking or force producing surfaces 25 which will cause the trim component to be correctly positioned with respect to the sheet metal structure 24. The force producing surface has a plurality of members 27 which function to prevent rotation of the rotatable fastener 26 with respect to the trim component 22. The members 27 are configured to engage dimples 31 formed in the trim component 22. The trim component 22 can have a locking finger 36 which is configured to selectively engage the locking notch 38 disposed on the rotatable fastener 26.

Figure 2:
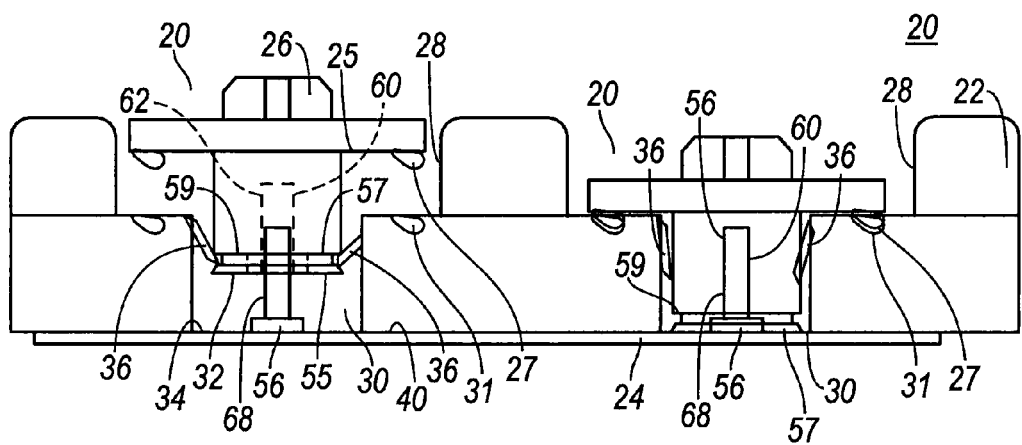
FIG. 2 is a side view of the fastener system from FIG. 1.
Figure 3:
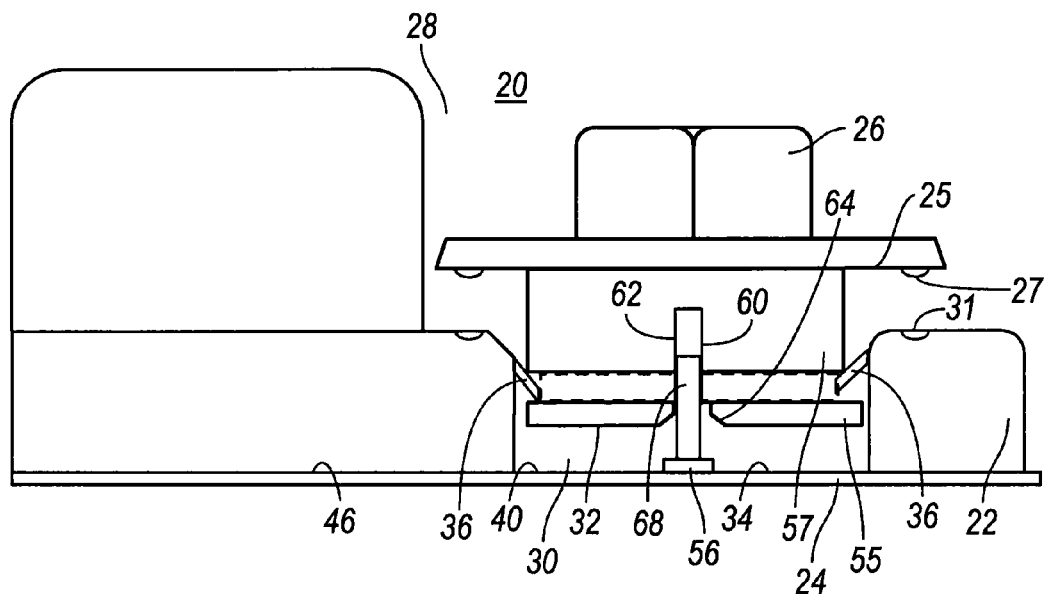
FIG. 3 is a cross sectional view of the fastener system from FIG. 1.

FIGS. 1-3 represent the coupling of the trim component 22 to the sheet metal structure 24. The sheet metal structure 24 has a surface 40 which acts as bearing and alignment surfaces for the trim component 22. The trim component 22 has a complimentary surface 46 which is configured to engage the surfaces 40 of the sheet metal component. The trim component 22 can have an interior surface 52 or a planar member obverse the surface 40.

As shown in FIG. 2, defined on the member obverse surface 48, the trim component 22 defines an aperture 28 configured to be positioned over the stud 56 which is welded to the sheet metal structure 24. Optionally, the locking finger 36 engages the locking feature disposed on the rotatable fastener 26. The rotatable fastener 26 can be pushed onto the stud 56, or rotated down the threaded structure to engage the members or protrusions 27 with the dimples 31 formed on the trim component 22. Upon engagement, the locking flanges 36 deform and allow movement of the floating rotatable fastener 26.

Optionally, the locking flanges 36 can be deformed into an aperture defined in the trim component 22. Further, the locking flanges 36 can suspend the rotatable fastener 26 at a central location within the aperture 28.

The stud 56 is positioned through a through aperture defined by the aperture 28. As shown, the trim component 22 can have a pair of coupling mechanisms 20 to couple the trim component 22 to the sheet metal structure 24. The trim component 22 is translated with respect to the sheet metal structure 24, sliding the stud 56 within the aperture 28 and into the rotatable fastener 26. In this regard, it is envisioned the rotatable fastener 26 can define an aperture therein which is formed of a plastically deformable material which can be slid over the threads of the weld stud.

FIG. 3 represents a side sectional view of the coupling of the trim component to the sheet metal structure 24. Shown is the alignment of the stud with the coupling mechanism 20. The rotatable fastener 26 can have a pair of generally circular coupling flanges 55 and 57 or surfaces which are configured to slidably and rotatably couple the floating fastener 26 to the trim component 22. Protruding from the second coupling flange 57 is the engagement surface 59. This engagement surface 59 can be generally parallel to the first coupling flange 55 and generally perpendicular to the weld stud 56 or parallel to the head 68 of stud 56.

Shown is a generally cylindrical inner aperture 60 configured to accept the weld stud 56. The aperture 60 has a first portion 62 having a first diameter and a second portion 64 having a second diameter larger than the first diameter. Also shown is a protruded surface 27 which assists in guiding the threaded portion 68 of the weld stud 56 into the second position 64 of the aperture 68. Fluidly coupled to the aperture 60 is the side slot 61 configured to allow access by the weld stud 56 to the cylindrical inner aperture 60. The trim component 22 is slid so as to engage a trim piece bearing surface 72 with the sheet metal. In this position, the weld stud 56 is incorporated into the cylindrical inner aperture 60.

Figure 4:
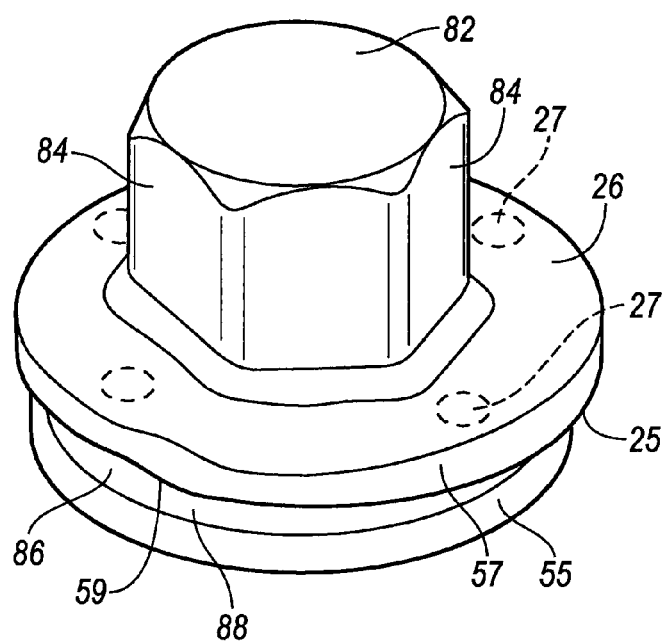
FIG. 4 is a perspective view of the fasteners from FIG. 1 coupled together for feeding.

FIG. 4 represents a perspective view of the rotatable fastener 26 according to the present teachings. The rotatable fastener 26 has a generally cylindrical body 82 having the assembled coupling features. The top portion can have a plurality of planar flanged surfaces 84 which can be used to engage a tool. The first flange 55 defines a slot 86 and locking portion 88. These surfaces can guide the body of the weld stud 56 in instances when the rotatable fastener 26 is not properly aligned with the weld stud 56.

Figure 5:
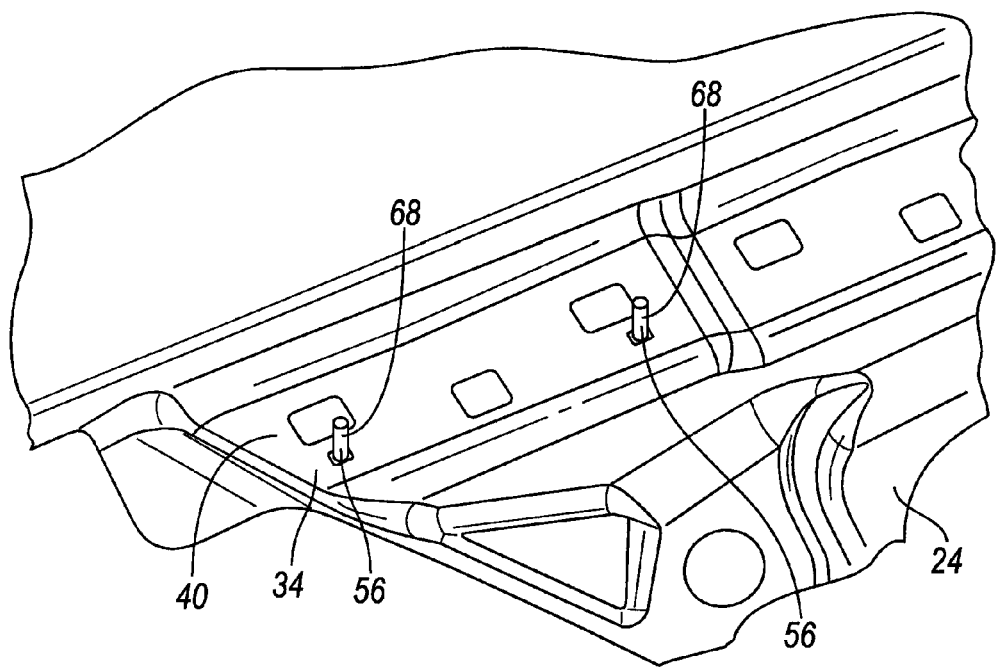
FIG. 5 represents a sheet metal vehicle component having a weld fastener according to the present teachings.
Figure 6:
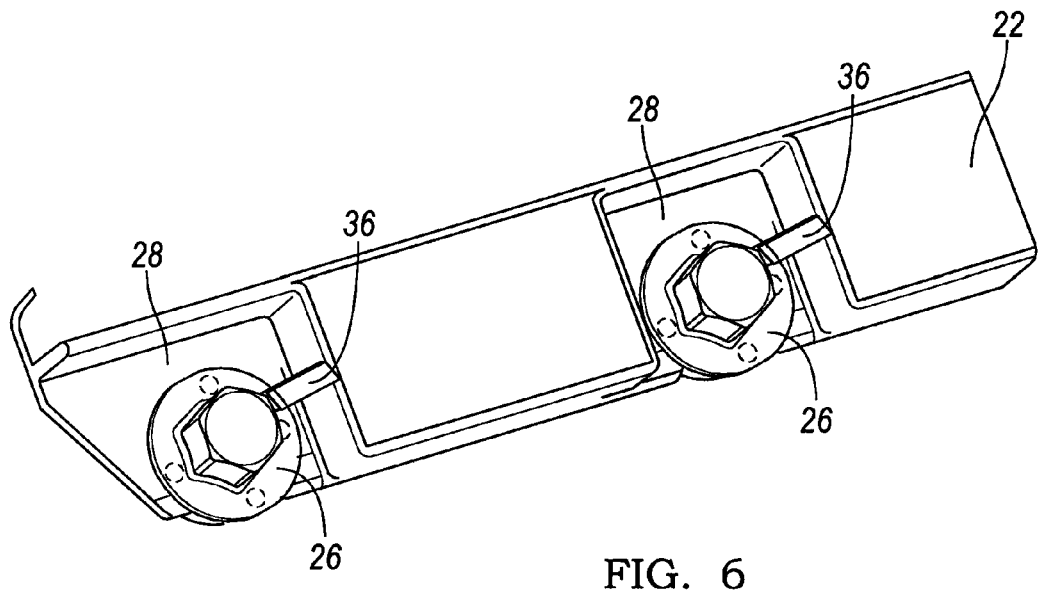
FIG. 6 represents a trim component having the fastener rotatable fastener shown in FIG. 4.

FIGS. 5 and 6 represent a sheet metal structure 24 and trim component shown in FIGS. 1-3. The sheet metal structure 24 has an associated bearing surface 34. Coupled to the bearing surface 34 is a pair of spaced apart weld fasteners 56. This bearing surface 34 is configured to bear against the trim component bearing surface 46.

FIG. 6 represents a perspective view of the trim component 22. The rotatable fastener 26 can be held in place by a single deformable flange coupled to the annularly disposed notch 86. When coupling the trim component to the sheet metal surface 34, the rotatable fastener 26 is positioned over the weld stud 56. This trim component can then be pressed into place to engage the rotatable fastener 26 onto the threads of the weld stud 56. Alternately, the rotatable fastener 26 can be rotated onto the weld stud 56 to pull the trim component 22 toward the sheet metal structure. The protrusion 27 can then be positioned into the dimple 31 to prevent rotation of the fastener.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

Exemplary embodiments of the present invention have been described for illustrative purposes, and those skilled in the art will appreciate that various modifications, additions and substitutions are possible, without departing from the scope and spirit of the invention as disclosed in the accompanying claims. The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A system for coupling a trim component to a sheet metal component comprising:
   a non-rotatable threaded fastener welded to the sheet metal component;
   the trim component having a first bearing surface configured to bear against a second sheet metal bearing surface, said trim component defining a trim aperture and a plurality of deformable fingers extending into the trim aperture; and
   a rotatable fastener annularly supported within the trim aperture, the rotatable fastener having a generally cylindrical body, said cylindrical body defining an external side slot, the rotatable fastener defining a cylindrical interior cavity having a thread engaging portion having a first diameter and an angular lead in portion having a second diameter larger than the first diameter to guide the non-rotatable threaded fastener to the thread engaging portion;
   wherein the plurality of deformable fingers extend into the external side slot and support the rotatable fastener within the trim aperture in a first axial floating position relative to the trim component prior to engaging the non-rotatable threaded fastener, and wherein the deformable fingers deform to allow the rotatable fastener to move to a second axial engagement position relative to the trim component wherein the rotatable fastener receives the non-rotatable fastener within the thread receiving portion and fixedly couples the trim component against the sheet metal component; and
   wherein the thread engaging portion of the rotatable fastener engages threads of the non-rotatable fastener when in the second axial engagement position to enable removal of the rotatable fastener from the non-rotatable fastener by a counter-rotation of the rotatable fastener.

2. The system according to claim 1, wherein the rotatable fastener further comprises a head flange having a head flange bearing surface configured to bear against a trim piece bearing surface and fixedly capture the trim piece between the head flange and the sheet metal component, wherein the head flange bearing surface and the trim piece bearing surface comprise cooperating anti-rotation members.

3. The system according to claim 2, wherein the cooperating anti-rotation members comprise protrusions that engage dimples when the rotatable fastener is in the second axial engagement position.

4. The system according to claim 1, wherein the external side slot of the rotatable fastener comprises an annular groove configured to interface with the deformable fingers to center the rotatable fastener within the trim aperture when the rotatable fastener is in the first axial floating position.

5. The system according to claim 1, wherein the cylindrical interior cavity of the rotatable fastener is a through bore.

6. The system according to claim 1, wherein the rotatable fastener further comprises a head flange and wherein the deformable fingers extend at a first angle into the side slot when the rotatable fastener is in the first axial floating position, and the deformable fingers extend at a second angle and engage against an outer surface of the rotatable fastener between the side slot and the head flange when the rotatable fastener is in the second axial engagement position.

7. The system according to claim 6, wherein the side slot comprises an annular groove formed between first and second groove-forming flanges.

8. The system according to claim 1, wherein the deformable fingers extend at a downward angle from the trim component toward the side slot and toward the lead-in portion of the rotatable fastener when in the first axial floating position.

9. The system for coupling a trim piece to a body component having a bearing surface, the system comprising:
   a non-rotatable threaded fastener coupled to the body component;
   the trim piece having a first bearing surface and an opposing second bearing surface, said trim piece defining a trim aperture having a plurality of deformable fingers extending into the trim aperture;
   a rotatable fastener having a generally cylindrical body, said cylindrical body defining a fastener holding aperture having a thread engaging portion and a side slot, said rotatable fastener having a head flange defining a head flange bearing surface configured to bear against the first bearing surface of the trim piece;
   wherein the plurality of deformable fingers extend into the external side slot and support the rotatable fastener within the trim aperture in a first axial floating position relative to the trim piece prior to engaging the non-rotatable threaded fastener, and wherein the deformable fingers deform to allow the rotatable fastener to move to a second axial engagement position relative to the trim piece wherein the rotatable fastener body receives the non-rotatable fastener within the fastener holding aperture and fixedly captures the trim piece between the head flange and the body component; and
   wherein the head flange bearing surface and the trim piece bearing surface comprise cooperating anti-rotation members that engage each other to resist rotation of the rotatable fastener relative to the non-rotatable fastener when in the second axial engagement position.

10. The system according to claim 9, wherein the cooperating anti-rotation members comprise protrusions that engage dimples when the rotatable fastener is in the second axial engagement position.

11. The system according to claim 10, wherein the head flange bearing surface comprises the protrusions and the first bearing surface of the trim piece comprises the dimples.

12. The system according to claim 9, wherein the non-rotatable fastener is plastically deformable.

13. A system for coupling a trim component to a sheet metal component of an automobile comprising:
   a non-rotatable threaded fastener welded to the sheet metal component of the automobile;
   the trim component having a first bearing surface and an opposing second bearing surface, said trim component defining a trim aperture and a plurality of deformable fingers extending into the trim aperture;
   a rotatable threaded fastener having a head flange defining a head flange bearing surface configured to bear against the first bearing surface of the trim component, the rotatable fastener having a generally cylindrical body, the cylindrical body defining an external side slot, the rotatable threaded fastener defining a cylindrical interior cavity having a threaded portion;

wherein the plurality of deformable fingers extend into the external side slot and support the rotatable threaded fastener within the trim aperture in a first axial floating position relative to the trim component prior to engaging the non-rotatable threaded fastener, and wherein the deformable fingers deform to allow the rotatable threaded fastener to move to a second axial engagement position relative to the trim component wherein the rotatable threaded fastener receives the non-rotatable fastener within the thread receiving portion and fixedly couples the trim component against the sheet metal component;

wherein the head flange bearing surface and the trim component bearing surface comprise cooperating anti-rotation members that engage each other to resist rotation of the rotatable fastener relative to the non-rotatable fastener when in the second axial engagement position.

14. The system according to claim 13, wherein the cooperating anti-rotation members comprise protrusions that engage dimples when the rotatable fastener is in the second axial engagement position.

15. The system according to claim 13, wherein the side slot comprises an annular groove.

16. The system according to claim 15, wherein the deformable fingers extend at a downward angle from the trim component toward the side slot and toward the lead-in portion of the rotatable threaded fastener when in the first axial floating position.

17. The system according to claim 16, wherein the threaded portion of the cylindrical interior cavity of the rotatable threaded fastener has a first diameter, and wherein the cylindrical interior cavity further comprises an angular lead-in portion having a second diameter larger than the first diameter to guide the non-rotatable threaded fastener to the threaded portion.

18. The system according to claim 13, wherein the deformable fingers extend at a first angle into the side slot when the rotatable threaded fastener is in the first axial floating position, and the deformable fingers extend at a second angle and engage against an outer surface of the rotatable fastener between the side slot and the head flange when the rotatable threaded fastener is in the second axial engagement position.

19. The system according to claim 18, wherein the side slot comprises an annular groove.

20. The system according to claim 13, wherein the threaded portion of the cylindrical interior cavity of the rotatable threaded fastener has a first diameter, and wherein the cylindrical interior cavity further comprises an angular lead-in portion having a second diameter larger than the first diameter to guide the non-rotatable threaded fastener to the threaded portion.

* * * * *